United States Patent [19]
Toh et al.

[11] Patent Number: 6,128,652
[45] Date of Patent: Oct. 3, 2000

[54] SYSTEM FOR MANIPULATING AND UPDATING DATA OBJECTS WITH REMOTE DATA SOURCES AUTOMATICALLY AND SEAMLESSLY

[75] Inventors: Eng Whatt Toh; Kok Hoon Teo; Yew Hong Frances Lee; Eng Kiat Koh, all of Singapore, Singapore

[73] Assignee: IT Innovations PTE LTD, Singapore, Singapore

[21] Appl. No.: 08/799,295

[22] Filed: Feb. 13, 1997

[30] Foreign Application Priority Data

Feb. 28, 1996 [SG] Singapore ............................ 9606223-7

[51] Int. Cl.[7] .................................................... G06F 15/16
[52] U.S. Cl. ........................... 709/219; 709/217; 709/218
[58] Field of Search ........................ 395/200.47, 200.48, 395/200.49; 709/217, 218, 219

[56] References Cited

U.S. PATENT DOCUMENTS

| | | |
|---|---|---|
| 5,708,780 | 1/1998 | Levergood et al. . |
| 5,710,884 | 1/1998 | Dedrick . |
| 5,712,979 | 1/1998 | Graber et al. . |
| 5,740,370 | 4/1998 | Bettersby ................................ 709/219 |
| 5,835,943 | 11/1998 | Yohe et al. .............................. 711/118 |
| 5,974,454 | 10/1999 | Apfel et al. .............................. 709/221 |

*Primary Examiner*—Krisna Lim
*Attorney, Agent, or Firm*—Lawrence Y. D. Ho; David D. Chung; Jacqueline C. T. Lui

[57] ABSTRACT

Applications are created having remote data sources linked to data objects on storage media such as CD-ROMs. These data objects are linked transparently to remote sources and updated automatically. An agent—based LiveServer accepts connections from at least one LivePlayer which may be linked to the invention remotely by a direct network link or a modem dial out to the terminal server to which the LiveServer is connected. When the LivePlayer fetches a resource from the network it shall first post its universal resource locator (URL) to the LiveServer. The LiveServer scans a translation table of alternative addresses for the URL. The LiveServer returns either an original or translated URL to the LivePlayer which then uses this URL to check its local hard disk cache to determine if the resource has been fetched earlier. If no such resource exists on the local cache the LivePlayer fetches the media from the remote site via the appropriate network protocol. This media will then be kept on the local cache and rendered by the LivePlayer. If the URL is found on the local cache, the appropriate network protocol will be used to contact the remote site to determine if it is outdated. If the cache is outdated, the local file is replaced by the new file fetched from the remote site. Otherwise the local file is rendered by the LivePlayer. The LiveServer automatically broadcasts updates to remote data sources to all currently connected LivePlayers, which then update the media by doing a remote fetch if it is currently been browsed. These LiveServer broadcasts thus provide live updates to data objects.

26 Claims, 7 Drawing Sheets

SYSTEM FOR MANIPULATING AND UPDATING DATA OBJECTS WITH REMOTE DATA SOURCES AUTOMATICALLY AND SEAMLESSLY

FIELD OF THE INVENTION

The present invention relates to a system for creating interactive, online computing applications. In particular, the present invention pertains to a system for creating remote link files on storage media such as CD-ROM while offering seamless online connectivity to update them.

BACKGROUND OF THE INVENTION

Storage technology and networking technology are the two pillars of the computing revolution. Storage medium, such as CD-ROM, is known for its massive storage, good quality playback of data, relatively fast retrieval of information and ubiquitous availability through home computers. However, storage technology has its disadvantages: the information stored in the media cannot be updated automatically by the information publisher, becomes obsolete quickly and errors cannot be corrected. Above all storage technology offers limited interactivity. On the other hand, networking technology offers users highly dynamic data exchange, provides up-to-date information, multi-user interactivity and unlimited number of data sources. The shortcoming of networking technology are its limited bandwidth, slow and relatively unreliable data retrieval, unstructured data and high maintenance cost.

Recently multimedia companies in the United States announced plans for a new interactive, online multimedia technology to provide hybrid CD-ROMs. These CD-ROMs shall combine the rich multimedia contents of the traditional CD-ROM media with the online connectivity of networking technology. Such online connection hybrid CD-ROMs connect up-to-the minute information online that relates to the multimedia rich contents on the CD-ROM. See, Bruce Milligan, Hybrid CD ROMs: Tools For The New Media Consumer, Multimedia Online Magazine (Issue No. 1, October 1995) pages 84–91.

Despite the announcement of the hybrid CD-ROMs by US multimedia companies, the titles that are produced thus far for hybrid CD-ROMs programs do not offer seamless updating of data objects on hybrid CD ROMs by remote data sources. By seamless connection or updating of the data objects by remote data sources, the present invention refers to the transparent linkage between the data objects with the remote data sources and the automatic updating of such data objects without the users' awareness of such process.

OBJECT OF THE INVENTION

It is an object of the present invention to combine seamlessly the storage and networking technology in delivering interactive, online services and products.

It is another object of the present invention to produce a system for delivering applications that achieve rich, dynamic and constantly up-to-date multimedia experiences for the users.

It is yet another object of the present invention to provide applications for delivering seamless connectivity with remote data sources for multimedia information residing on a high capacity storage medium such as CD-ROM.

SUMMARY OF THE INVENTION

The present invention creates applications having remote data sources linked to data objects on storage media such as CD-ROMs. These data objects are linked transparently to remote sources and updated automatically. In the preferred embodiment of the present invention an agent—based LiveServer accepts connections from at least one LivePlayer which may be linked to the invention remotely by a direct network link or a modem dial out to the terminal server to which the LiveServer is connected. When the LivePlayer fetches a resource from the network it shall first post its universal resource locator (URL) to the LiveServer. The LiveServer scans a translation table of alternative addresses for the URL. The LiveServer returns either an original or translated URL to the LivePlayer which then uses this URL to check its local hard disk cache to determine if the resource has been fetched earlier. If no such resource exists on the local cache the LivePlayer fetches the media from the remote site via the appropriate network protocol. This media will then be kept on the local cache and rendered by the LivePlayer. If the URL is found on the local cache, the appropriate network protocol will be used to contact the remote site to determine if it is outdated. If the cache is outdated, the local file is replaced by the new file fetched from the remote site. Otherwise the local file is rendered by the LivePlayer. The LiveServer automatically broadcasts updates to remote data sources to all currently connected LivePlayers, which then update the media by doing a remote fetch if it is currently been browsed. These LiveServer broadcasts thus provide live updates to data objects.

BRIEF DESCRIPTION OF THE DRAWINGS

In FIG. 2A, the LivePlayer is provided with direct linkage with remote data sources over a local area network, an internet service provider and a network infrastructure. In FIG. 2B, the LivePlayer is connected to remote data sources over a modem, a terminal server, an internet service provider and a network infrastructure. In FIG. 2C, the LivePlayer is coupled to the remote data sources over a modem, a terminal server, a LiveServer host computer and a proxy server.

DESCRIPTION OF THE EMBODIMENT OF THE INVENTION

Figure 1:
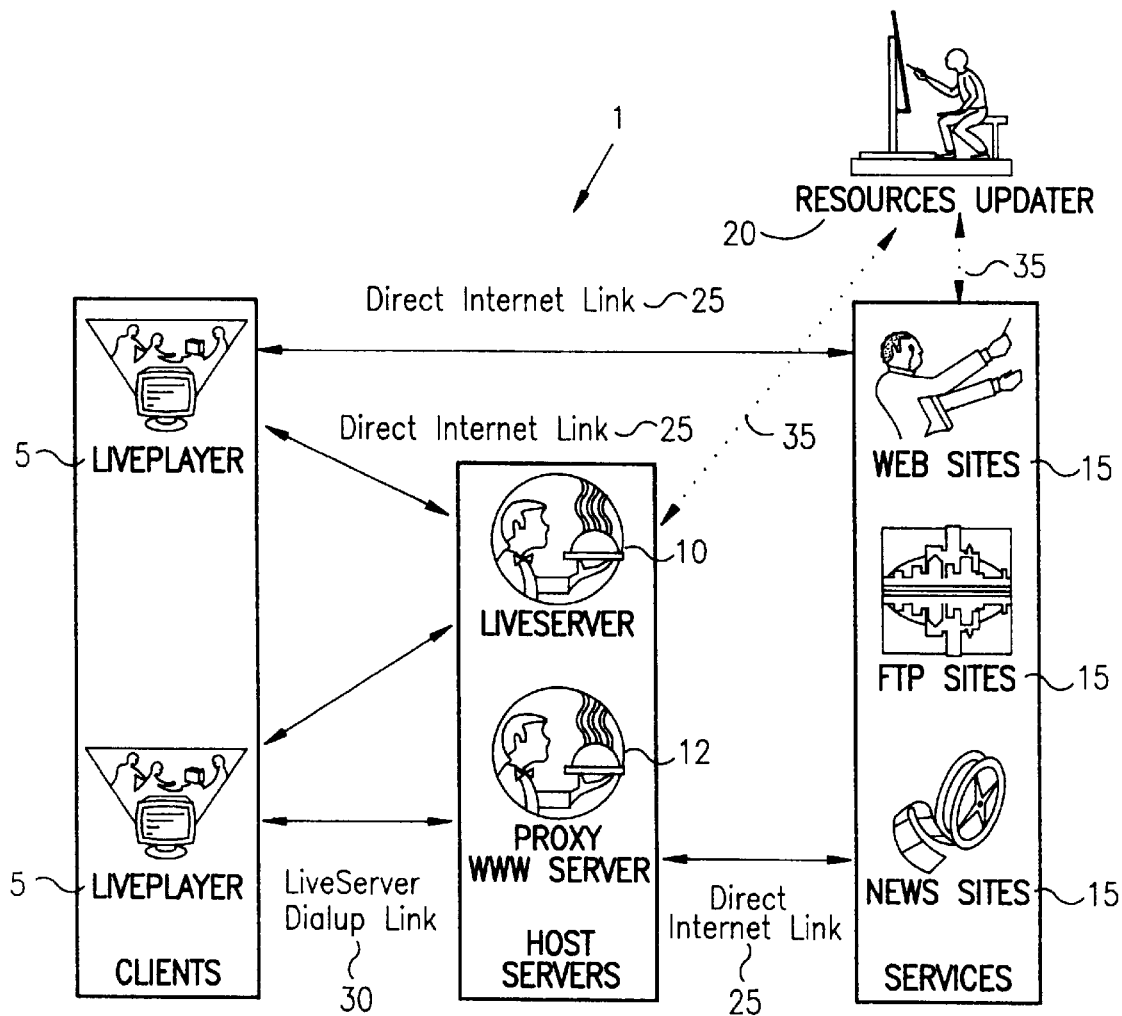
FIG. 1 is a diagram illustrating the architecture of the present invention.

A system for linking remote data sources to data objects on storage media transparently and updating them automatically in a network environment is described. In the following description, numerous specific details are set forth such as bit pattern and program steps, etc. in order to provide a thorough understanding of the present invention. It will be obvious to one skilled in the art that the present invention may be practiced without these specific details. In other instances, well-known parts such as those involved with the server and client architecture and hardware are not shown in order not to obscure the present invention.

Notation and Nomenclature

The detailed description with respect to the data objects as well as the implementation of seamless integration of data objects on storage media with remote data sources are presented partially in terms of algorithm and symbolic representation upon operation on data structure and files within the computer memory. These algorithmic descriptions and representations are the means used by those skilled in the data processing arts to most effectively convey the substance of their work to others skilled in the art.

An algorithm is here, and generally, conceived to be a self-consistent sequence of steps leading to a desired result. These steps are those require physical manipulation of physical quantities. Usually, though not necessarily, these quantities take the form of electrical or magnetic signals capable of being stored, transferred, combined, and otherwise manipulated. In this case, the physical quantities are voltage signals which correspond to the multimedia objects. It proves convenient at times, principally for reason of common usage, to refer to these signals as bits, values, elements, symbols, characters, terms, numbers or the like. It should be borne in mind, however, that all of these and similar terms are to be associated with the appropriate physical quantities and are merely convenient labels applied to these quantities.

Further, the manipulations performed are often referred to in terms such as adding or comparing, which are commonly associated with the mental operations performed by a human operator. No such capability of a human operator is necessary, or desirable. In most cases, in any of the operations described herein which form part of the present invention; the operations are machine operations. Useful machines for performing the operations of the present invention include general purpose digital computers or similar devices such as multimedia computers. In all cases, it should be borne in mind that there is a distinction between the method operation in operating a computer and the method of computation itself. The present invention relates to method steps for operating a computer in linking and updating data object automatically to generate other desired physical signals.

The present invention also relates to an apparatus for performing these operations. This apparatus may be specially constructed for the required purpose or it may comprise a general purpose computer as selectively activated or reconfigured by a computer program stores in the computer. The algorithms presented herein are not inherently related to any particular computer or other apparatus. In particular, various general purpose machines may be used with programs written in accordance with the teachings herein, or it may prove more convenient to construct specialized apparatus such as multimedia computers to perform the required method steps. The required structure for a variety of these machines would appear from the description given below.

GENERAL SYSTEM CONFIGURATION

FIG. 1 is a diagram illustrating the architecture of the present invention. The present invention 1 is centered around at least one agent-based LiveServer 10 which accepts connections from at least one LivePlayer 5 which may be linked to it remotely via a direct Internet link 25 (client has its own IP address) or a modem dialup 30 to the terminal server to which the LiveServer is connected. The host machine maintains a World Wide Web (WWW) Server 12 which acts as a proxy server for all LivePlayers on the LiveServer Dialup Link 30. On behalf of the LivePlayers 5, the proxy Server 12 is responsible for procuring updates to data objects from remote data resources 15 such as the internet. In the preferred embodiment of the present invention, the proxy Server 12 is a hyper text transfer protocol daemon (HTTPD).

The present invention 1 supports at least two modes of resources. They are:(1) static resource—resource that does not change at any time, generally stored permanently on storage media; and (2) dynamic resource—including net media, or hybrid media. Dynamic resources are broadly characterised as follows:

Net Media

This refers to resources that, by default, have to be brought in from remote data sources 15 on demand by the LivePlayer 5. Net media can be cached on the users' local harddisk seamlessly, so that the next request to bring the media in from the remote data sources will be processed locally if the file in the cache is updated.

Hybrid Media

This refers to media that defaults to static resource if the LivePlayer 5 is not connected to the remote data sources 15, or if there is no change to the media, as noted by the LiveServer 5. Unlike static resource, hybrid media may be changed on demand by the LivePlayer 5 if the LiveServer 10 translates its URL to another (possibly remote) locator. Like net media, hybrid media can also be cached on the users' local harddisks seamlessly.

Live Media

Live media are special hybrid or net media that are updated from remote data sources 15 upon notification from the Resource Provider through a Resource Updater 20. Unlike normal net or hybrid media, if a Live media is being browsed by the user, it will be refreshed immediately when an update message from LiveServer 10 is received by the LivePlayer 5 for this media. The details of this updating process is described in connection with the flowchart shown in FIG. 6.

By data object, the present invention envisages an object having static resource, net or hybrid media. An application created by the authoring tool of the present invention can have a combination of such resource and media. In the preferred embodiment of the present invention, each data object is characterised by either three tags—STATIC, NET or HYBRID.

Figure 2A:
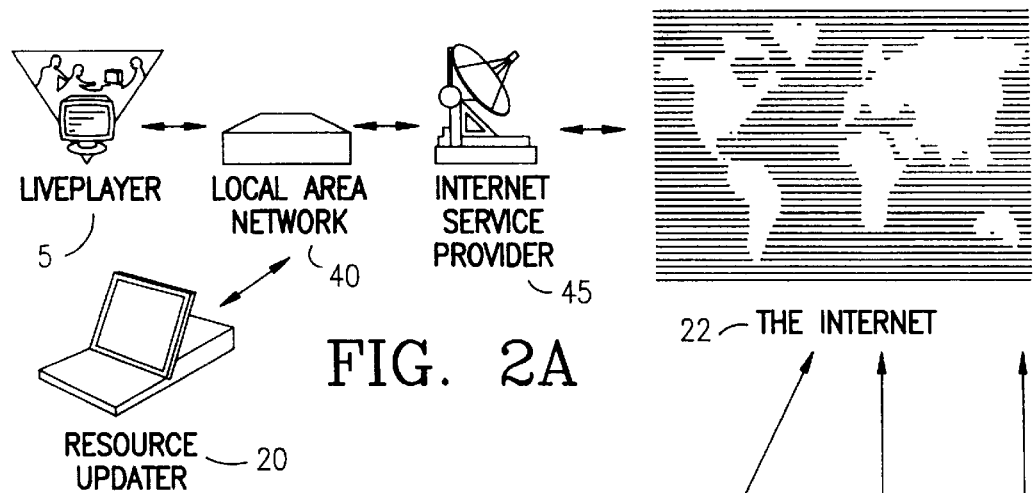
FIGS. 2A, 2B and 2C show three possible paths where updates to data object can be implemented according to he present invention in a network environment.
Figure 2B:
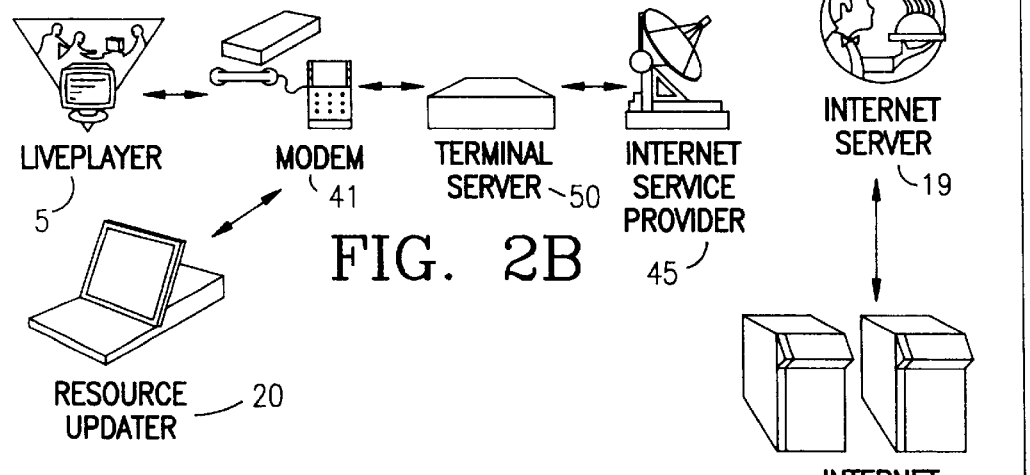
Figure 2C:
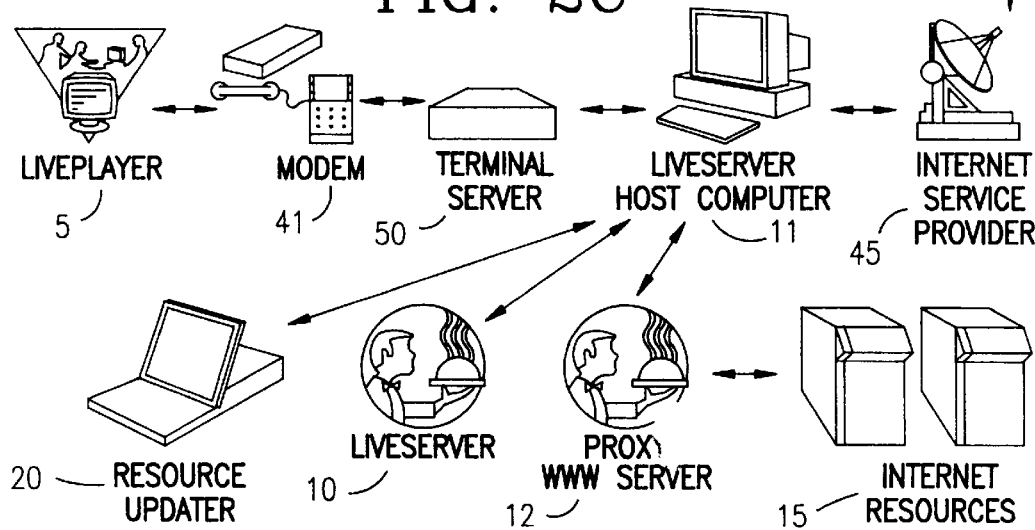

FIGS. 2A–2C show three possible paths where updates to data object can be implemented according to the present invention in a network environment. In FIG. 2A, LivePlayer 5 is provided with direct linkage with remote data sources 15 over a local area network (LAN) 40, an internet service provider 45 and a network infrastructure 22. In the mean time, the resource updater 20 provides new data and information to LiveServer 10 via LAN 40, Internet service provider 45 and network infrastructure 22. Alternatively in FIG. 2B, LivePlayer 5 is connected to remote data sources 15 over a modem 41, a terminal server 50, internet service provider 45 and network infrastructure 22. Here, resource updater 20 provides new data and information to LiveServer 10 via modem 41, terminal server 50, internet service provider 45 and network infrastructure 22. In another path as illustrated graphically in FIG. 2C, the LivePlayer 5 is coupled to the remote data sources 15 over modem 41, terminal server 50, a LiveServer host computer 11, and proxy Server 12. Here, in addition to the resource updater 20 and the LiveServer 10, the proxy WWW server 12 maintains linkage with other remote data sources 15. The functions of such linkage will be described in further details below.

LIVEPLAYER

Figure 3:
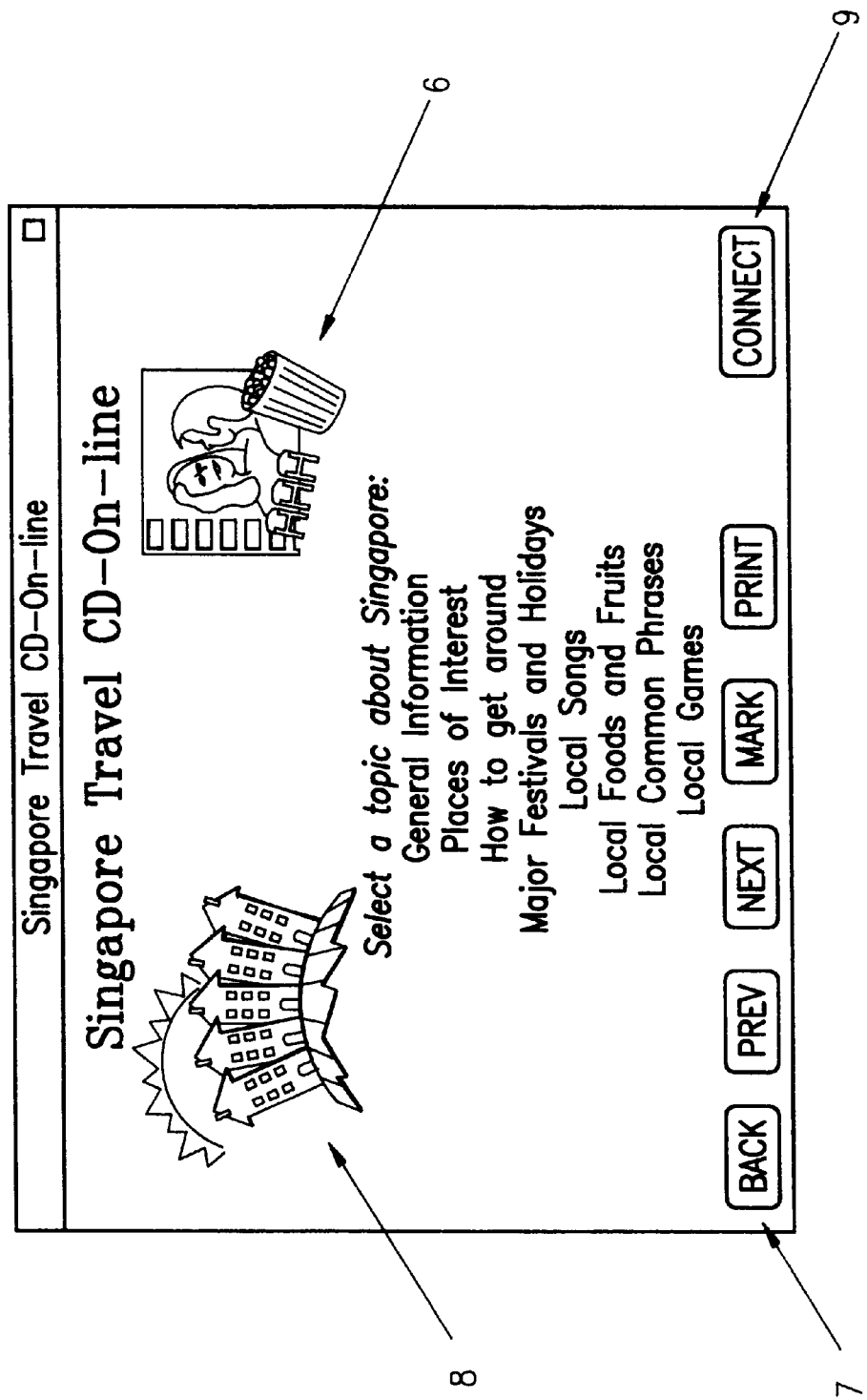
FIG. 3 is a sample application produced by an authoring tool with LivePlayer functions. The authoring tool preferably has a plugin dynamic link library (DLL) capability to load the LivePlayer DLL to access LivePlayer functions.

FIG. 3 is a sample application produced by an authoring tool with LivePlayer functions. The authoring tool preferably has a plugin dynamic link library (DLL) capability to load the LivePlayer DLL to access LivePlayer functions. The interface of the application is totally up to the content developer to establish. It may have a set of buttons or static controls 7 that allow users to navigate the application. On the other hand, the buttons 9 is tied to LivePlayer functions. For example, the CONNECT button is tied to the LP__Connect( ... ) function in the LivePlayer dynamic link library (DLL). When the user clicks on this button, the LivePlayer networking components will be initialized and the user will be connected to the LiveServer 10 after a predetermined login process. Users will also be able to create windows in their applications to display LivePlayer Static/Net/hybrid Media. Referring again to FIG. 3, window 8 allows the LivePlayer 5 to render a bitmap retrieved from remote data sources such as the Internet, and another window 6 which implements a LivePlayer static movie playback. All LivePlayer media consist of an address (URL) which identifies the media location.

LIVEPLAYER DLLS

The LivePlayer DLL used in the preferred embodiment of the present invention is a 32-bit Windows 3.1 client (with Win32s extensions). It implements all the functions required by the LivePlayer application. In order to use the LivePlayer DLLs, the authoring tool of the present invention used to produce the LiveCD contents have the capability to link the LivePlayer DLLs into the application it produces.

The multimedia application communicates with the LivePlayer DLL through a predefined application program interface (API). Some of the DLL commands are as follows:

COMMAND

| | |
|---|---|
| Name | LP__Init |
| Usage | LP__STATUS LP__Init( (HWND)hparentWnd ) |
| Description | Initializes the LivePlayer DLL. |
| | This function MUST be called by the LivePlayer before any functions in the LivePlayer can be used. |
| | The hparentWnd refers to the stage window on which the multimedia authoring tool displays its multimedia contents. |
| Return | LPS__INITIALIZED if successfully initialized, error status otherwise. |
| Name | LP__Connect |
| Usage | LP__STATUS LP$_{13}$ Connect( |
| | (LPSTR)liveserver__Phone__number, |
| | (LPSTR)liveserver__IP__address, |
| | (LPSTR)liveserver__Port__number, |
| | (LPSTR)liveCD__ID__string); |
| Description | Attempts to connect the LivePlayer DLL to a LiveServer. |
| | This function MUST be called by the Liveplayer before any networking functions in the LivePlayer is enabled. |
| | If the operating system does not have a WinSock stack initiated, this function will cause Trumpet WinSock stack (or any other WinSock stack implementation installed on the user's machine that has auto-startup capability) to start-up for SLIP/PPP interfacing with the LiveServer through modem dialup. If the operating system already has initialized a WinSock stack, an Internet connection is made to the LiveServer with the given service (liveCD__ID__string). |
| | A dialog box will pop up on connection with the LiveServer during which the user will have to specify a valid login ID and password. If the connection is successful, the LivePlayer networking features will be enabled. |
| Return | LPS__CONNECTED if successfully connected, error status otherwise. |
| Name | LP__Disconnect |
| Usage | LP__STATUS LP__Disconnect( void ); |
| Description | Attempts to disconnect the LivePlayer DLL from a LiveServer. |
| | This function MUST be called by the LivePlayer before the LivePlayer quits. |
| Return | LPS__DISCONNECTED if successfully disconnected, error status otherwise. |
| Name | LP__MailTo |
| Usage | LP__STATUS LP__MailTo( |
| | LPSTR recipient__email__address ); |
| Description | Display a dialog box which enables the user to send e-mail to an authenticated LiveCD user. |
| | If the recipient__email__address is not provided, then the dialog box will provide a list of all valid email addresses that the user may send to. |
| | In any case, an edit box will be provided for the user to type in a message. The user will also be provided with a common file open dialog box for the user to specify an optional attached document. |
| | This function should be called by the LivePlayer only after a LP__Connect has been successfully called. |
| Return | LPS__MAILTOSUCCESSFUL if successfully mailed, error status otherwise. |
| Name | LP__FaxTo |
| Usage | LP__STATUS LP__FaxTo( LPSTR fax__number, |
| | LPSTR ASCII__text__filename ); |
| Description | Display a dialog box which enables the user to send fax to an authenticated LiveCD user. |
| | If the fax__number is not provided, then the dialog box will provide a list of all valid fax numbers the user may send fax to. |
| | In any case, an edit box will be provided for the user to type in a message. |
| | An optional ASCII__text__filename allows users to attach an ASCII text file to the end of the fax message. |
| | This function should be called by the LivePlayer only after a LP__Connect has been successfully called. |
| Return | LPS__FAXTOSUCCESSFUL if successfully mailed, error status otherwise. |

MEDIA

| | |
|---|---|
| Name | LP__MediaCreate |
| Usage | LP__MEDIAID LP__MediaCreate( |
| | (HWND)hdestinationWnd, |
| | (RECT)drawingBounds, |
| | (LPSTR)URL, |
| | (LP__MEDIAMODE)mediaMode); |
| Description | Creates a LivePlayer media object. |
| | This function can be called by the LivePlayer at any time. The handle to the destination window and drawingBounds are used for creating the child window for the rendering of the LivePlayer media. Note that the drawingBounds may occupy part of or the entire destination window. |
| | The URL identifies the resource to be displayed in the destination Window. The LivePlayer DLL supports only the following formats for this version: |
| | .HTM - HTML 1.0 files (for all ASCII text output) |
| | .BMP - Windows Device Independent Bitmap files |
| | .AVI - Video for Windows video files |
| | .WAV - Windows Audio files |
| | Once the child window is created, it will be processing events internally and updating its display automatically. The mediaMode can be STATIC or DYNAMIC, indicating the kind of retrieval required by the media. |
| Return | LivePlayer Media object ID if successful, error status otherwise. |
| Name | LP__MediaDestroy |
| Usage | LP__STATUS |
| | LP__MediaDestroy( (LP__MEDIAID)nmediaID ); |

| | |
|---|---|
| Description | Deletes a LivePlayer media object and its associated child window.<br>This function can be called by the LivePlayer at any time. |
| Return | LPS_MEDIADELETED if successful, error status |

LIVESERVER

Figure 4:
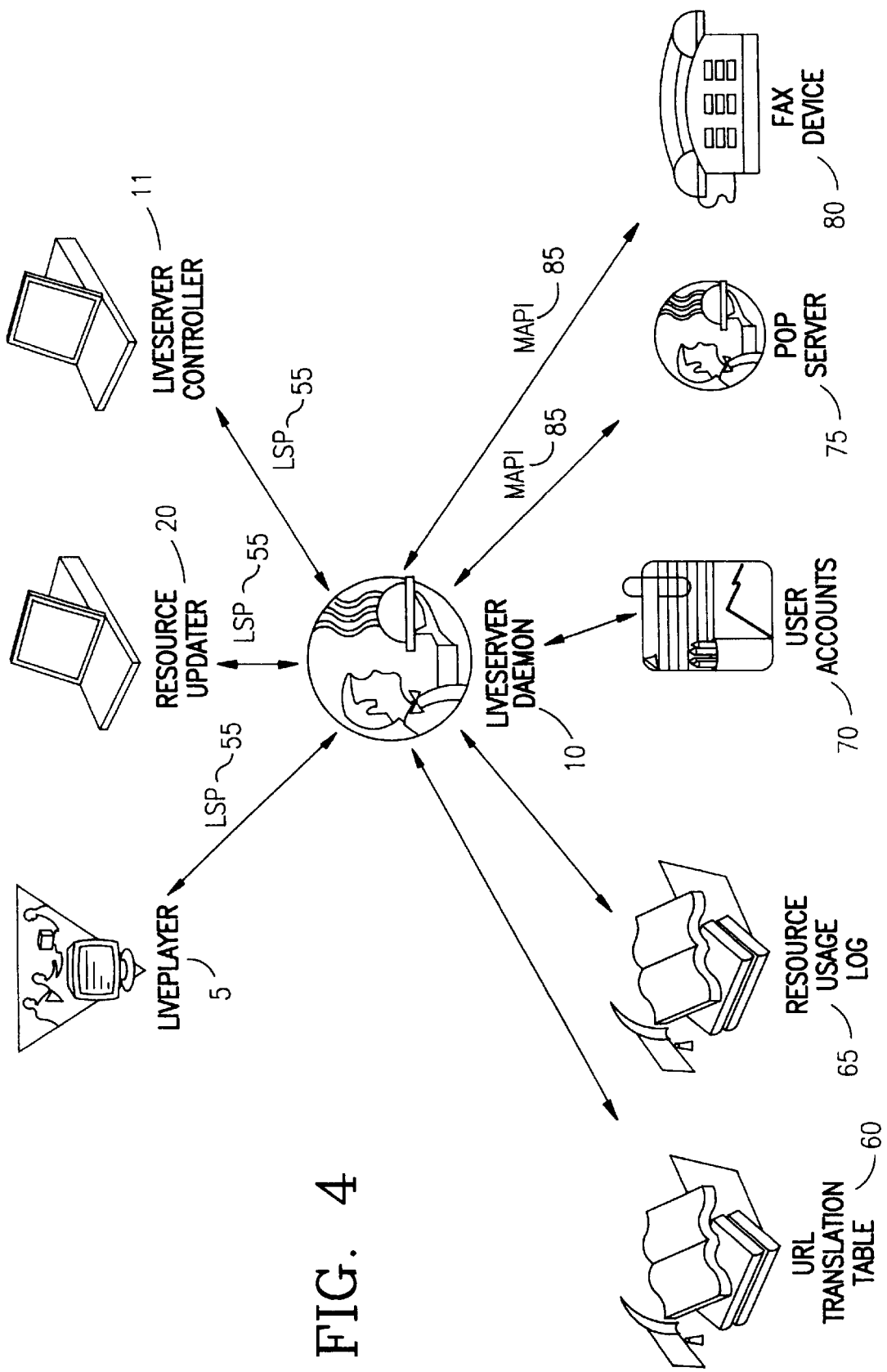
FIG. 4 illustrates different processes the LiveServer has with at least one LivePlayer and an URL translation table and others in implementing the seamless connection with remote data sources.

FIG. 4 illustrates different processes a LiveServer has with at least one LivePlayer, an URL translation table, a resource updater, and others in implementing the seamless connection with remote data sources. The LiveServer 10 is a multi-threaded daemon process. The LiveServer 10 accepts and maintains connections from multiple LivePlayers concurrently over the LiveCD Services Protocol (LSP) 55. Under this linkage, each of the LivePlayers may be referencing different data files. Referring again to FIG. 4, the LiveServer also maintains a translation table 60 as well as a resource usage log 65, an user accounts 70, POP server 75 and a facsimile device 80. The resource updater 20 also communicates over the LSP 55 with the LiveServer 10 for allowing a resource provider (not shown in FIG. 4) to update the remote data sources for which the resource provider is responsible. The main function of the resource updater 20 is to announce to the LiveServer 10 that a remote data source has been updated. The LiveServer 10 broadcasts the message automatically to any LivePlayer 5 connected to it. In the preferred embodiment of the present invention, the resource updater 20 is developed from a generic development kit of the present invention which provides networking functions for the resource updater to connect to and communicate with the LiveServer.

Figure 5:
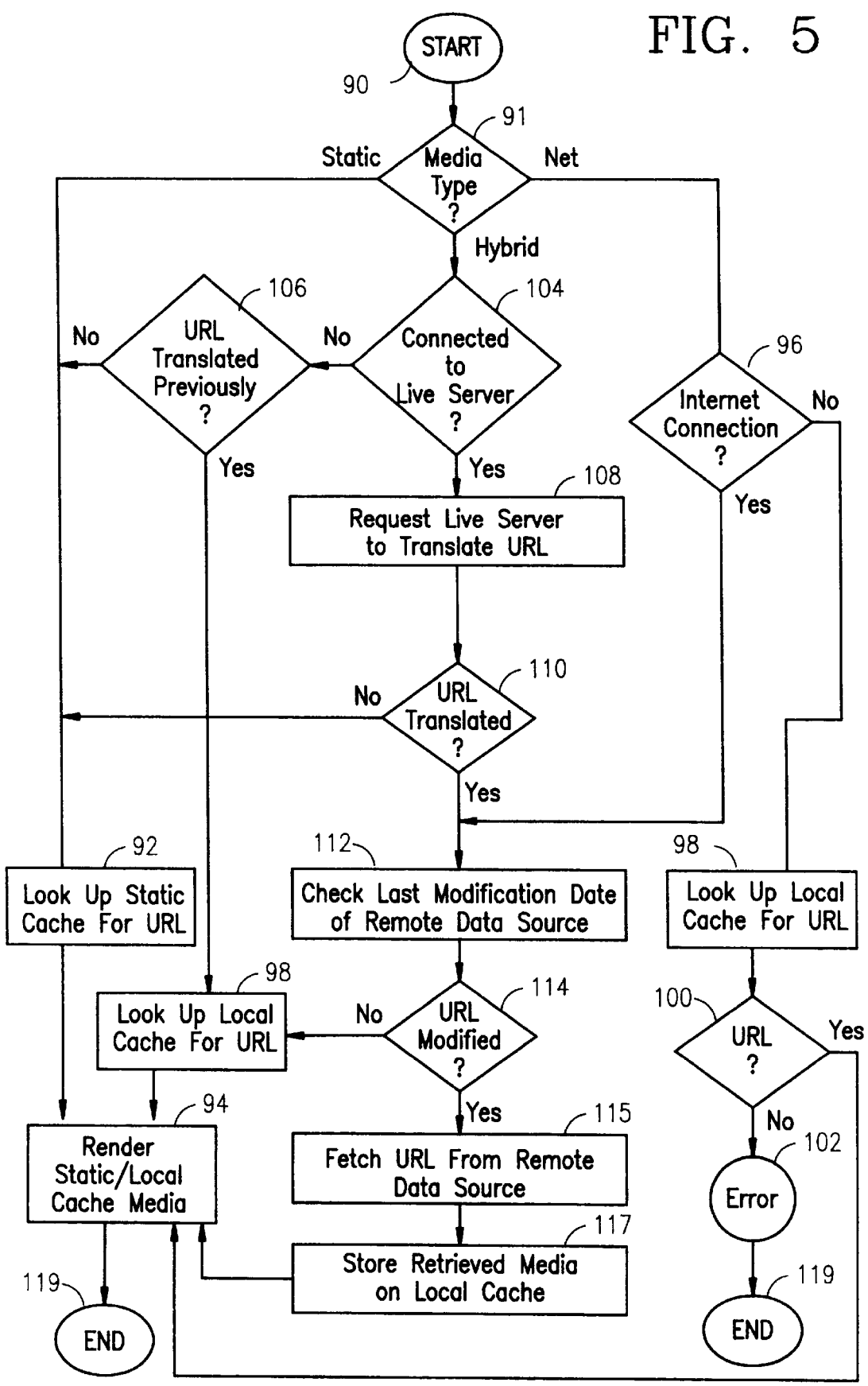
FIG. 5 is a flowchart illustrating the overall process of creating seamless linkages for various data objects on a storage media or a communication network with remote data sources in a preferred embodiment of the present invention.

Before the process of updating of data object is elaborated, the process of creating seamless linkages for such object with remote data sources is described below. FIG. 5 is a flowchart illustrating the overall process of providing seamless linkages for various data objects on a storage media or a communications network with remote data sources. In step 90 the process of creating such linkage commences with the LivePlayer 5 determining the characteristics of the data object. First, the media type is tested in step 91. If the media has a static tag, then the LivePlayer looks up the URL from the local cache of the CD-ROM of the LivePlayer in step 92. Thereafter, the contents of the media on the CD-ROM is rendered in step 94. Alternatively, if the media has a net tag, the process proceeds to step 96 where the existence of any remote network such as the internet is determined. If there is, then the process goes to step 112 which shall be elaborated further below. However, if there is no network connection, then the process looks up the URL in step 98. If URL is found on the local cache in step 100, then the contents is rendered in step 94. However, if no URL is found in step 100, then the process returns an error in step 102 and terminates in step 119.

The most interesting aspect of the process in FIG. 5 is that associated with the updating of a hybrid media which proceeds from step 91 to step 104 and then to step 117. Here in step 104, the LivePlayer 5 tests whether it is connected to any LiveServer. If the LivePlayer has no connection with any LiveServer, then the process determines whether the URL of the media object has been previously translated in step 106. If the URL has been translated previously, then LivePlayer looks up the local cache for the previous URL in step 98 and renders the contents in step 94. However, if the URL in step 106 has not been translated previously, the original URL resides on the static or CD-ROM cache and the process looks up this URL in step 104 and renders the contents in step 92. Like the static media, the contents of the translated URL is rendered in step 94.

Referring again to FIG. 5, step 108 is pursued if the media object is hybrid and currently connected to a LiveServer. Next in step 110, the LivePlayer requests the LiveServer to translate the URL according to the translation table 60 maintained by the LiveServer 10 in FIG. 4. The translation table 60 comprises alternative addresses for the URL. The translated URL is tested in step 110 to determine whether it is outdated. If the URL is not translated or outdated, then the LiveServer returns the original URL to the LivePlayer which will use this URL accordingly to steps 92 and 94. If the translated URL in step 110 is outdated, the process then proceeds to steps 112 to 117. In step 112, the LiveServer checks the last modification dates of the remote data source. Next, the URL is compared in step 114 to determine if it has been modified. If it has not been changed, then the LivePlayer looks up the URL on the local cache in step 98 and renders the contents in step 94. However, if modification of the URL is confirmed in step 114, then the process proceeds to step 115 where URL is fetched from remote data source. The retrieved media is stored on the local cache in step 117 and rendered in step 94.

The redundancy embodied in steps 114 to 117 of the flowchart in FIG. 5 ensures that media object identified by the LivePlayer are indeed outdated before their URL are modified and contents written onto the local cache of the LivePlayer. The overall process of creating linkage for data objects on a storage media or a communication network with remote data sources is automatic and in the background. As such, the connections between the data object and the remote data sources are seamless, and are a novel feature of the present invention.

Figure 6:
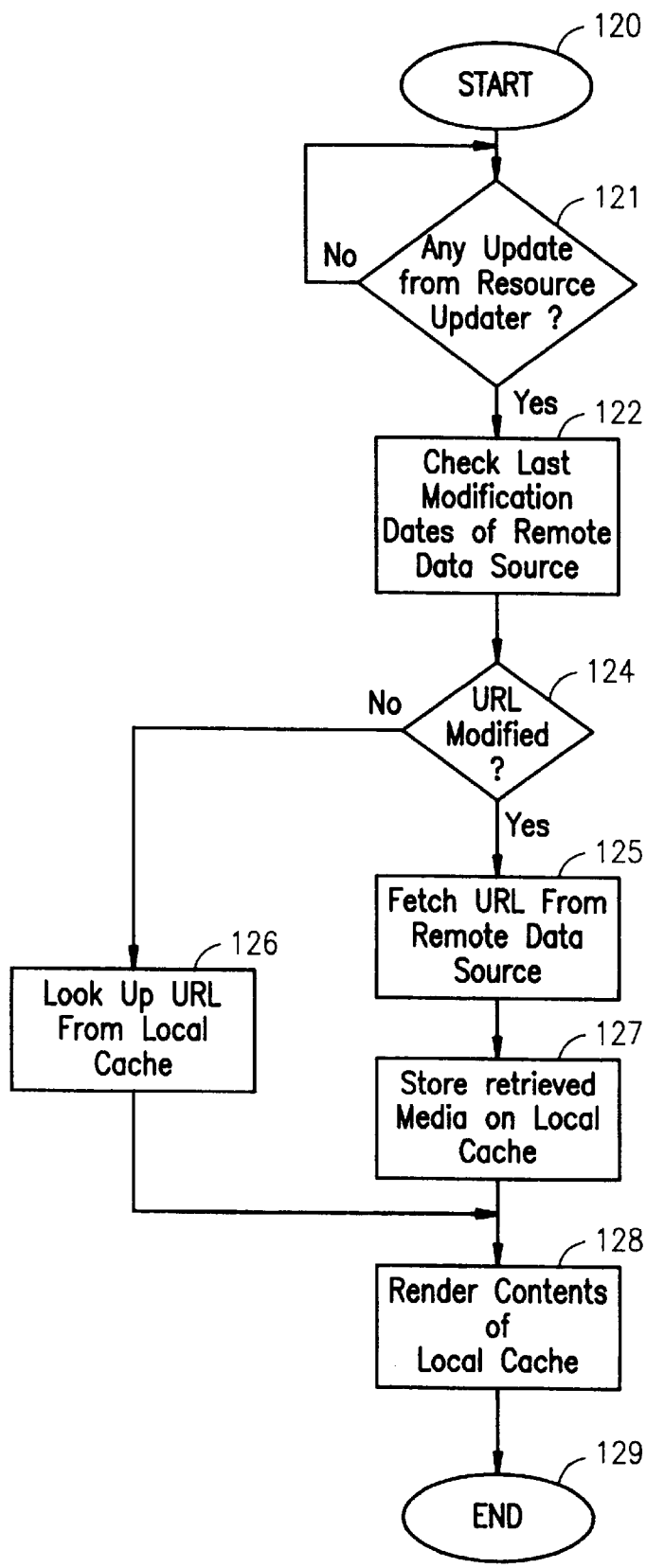
FIG. 6 is a flowchart illustrating how the LiveServer updates and broadcasts automatically modifications to remote data sources in an embodiment of the present invention.

FIG. 6 is a flowchart illustrating how the LiveServer Live updates by broadcasting automatically modifications to remote data sources. In step 120, the process of Live updating of data objects commences when at least one resource updater announces to the LiveServer that a remote data source has been updated. The LiveServer receives this announcement in step 121 and proceeds in step 122 to check the last modification made on the remote data source. In a networking environment such as the internet, a remote data source such as Hypertext Transfer Protocol Daemon (HTTPD) can be used. It should be understood by one skilled in the art that other daemons may be employed to check for modifications made on remote data sources. Next, in step 124 of FIG. 6, an URL is returned to the LiveServer from the remote data source. Here, the LiveServer checks if the URL has been modified. If the URL of the target media has not been changed, then the LivePlayer connected to the LiveServer looks up the URL from the local cache of the LivePlayer in step 126. Thereafter, the contents pointed to by the URL on the local cache is rendered in step 128.

Again in FIG. 6, where the URL of the data object is modified in step 124, the LiveServer fetches the modified URL in step 125. The retrieved media is then stored on the local cache of the LivePlayer connected to the LiveServer in step 127. Finally, the contents of the retrieved media are rendered in step 128. The process described by steps 120–129 of FIG. 5 is another novel feature of the present invention where a LiveServer updates and broadcasts automatically data objects for LivePlayer connected thereto as soon as resource updater announces such changes.

Figure 7:
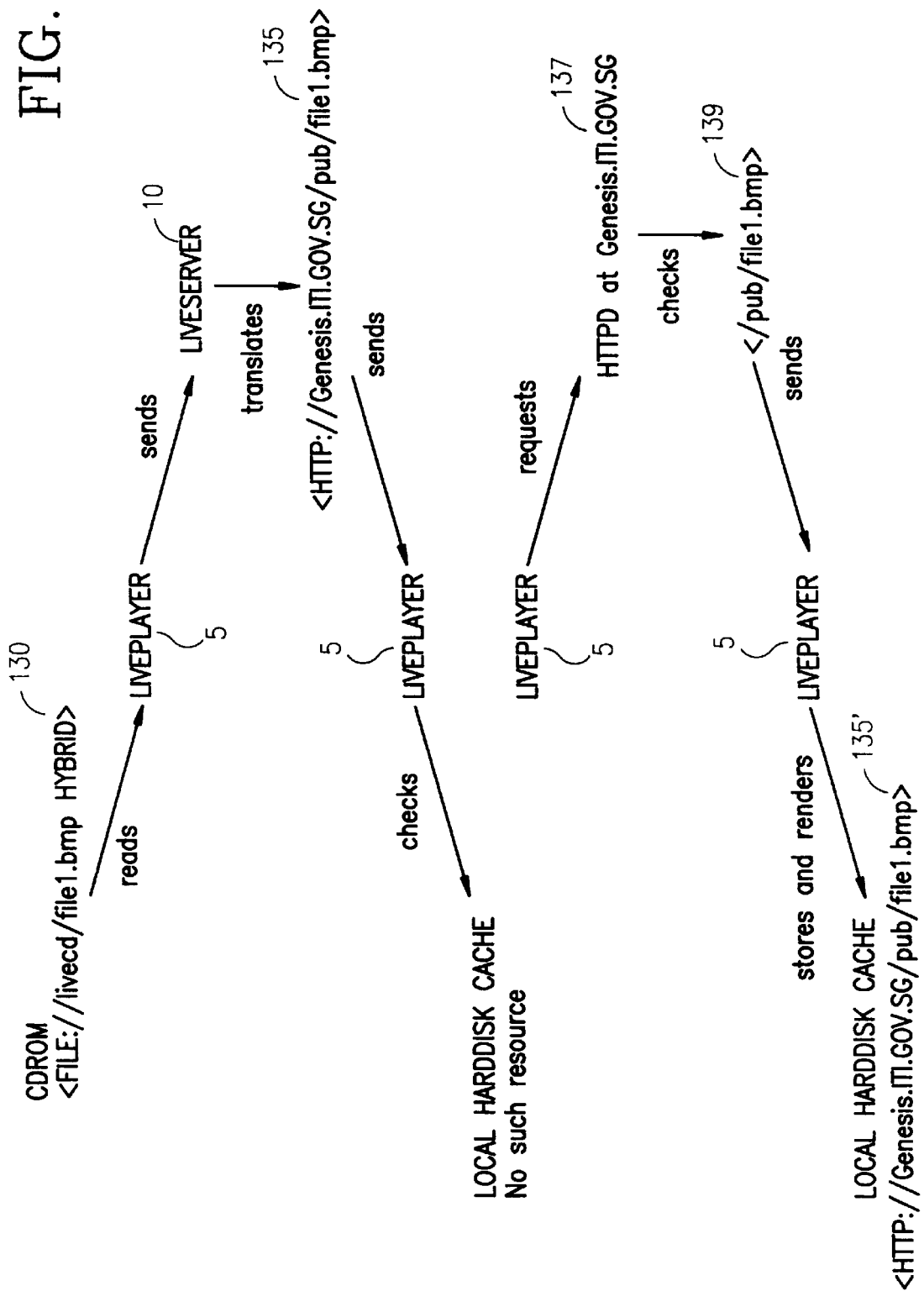
FIG. 7 shows graphically how a LivePlayer updates a data object with the process illustrated in FIG. 6 when it is not stored on the local cache of the LivePlayer.

FIGS. 7 shows graphically how a LivePlayer update a data object with the process illustrated in FIG. 5 when it is not stored on the local cache of the LivePlayer. A data object having URL <File://livecd/file1.bmp HYBRID> 130 on a CD-ROM is read by the LivePlayer 5. It is then sent over the LSP to the LiveServer 10. Here, the LiveServer 10 translates the URL with the translation table 60 into URL <HTTP://GENSIS.ITI.GOV.SG/pub/file1.bmp>135. The LiveServer 10 then transmits the translated URL to the LivePlayer 5. The LivePlayer checks this translated URL against its local harddisk cache to determine whether this resource exists. In the example illustrated in FIG. 7, no such resource exists. The LivePlayer 5 then requests proxy Server 12 or HTTPD to check for data source at </pub/file1.bmp>139. The proxy Server 12 then sends the updated data source <HTTP://GENESIS.ITI.GOV.SG/pub/file1.bmp>125" to the LivePlayer 5 for storing and rendering. It can be seen that the automatic update request for LivePlayer 5 coupled with the use of a translation table 60 by a LiveServer 10 manipulates and updates data objects on storage medium automatically and seamlessly with remote data sources.

While the present invention has been described particularly with reference to FIGS. 1 to 7 with emphasis on a system for creating applications having linkage with remote data sources on storage media such as CD-ROM which are updated automatically in a network environment, it should be understood that the figures are for illustration only and should not be taken as a limitation on the invention. In addition, it is clear that the system of the present invention has utility in many applications where automatic updating of data object is required. It is contemplated that many changes and modifications may be made by one of ordinary skill in the art without departing from the spirit and the scope of the invention as described.

We claim:

1. In a system for creating applications for data object on storage media including at least one LiveServer adopted for accepting connections from at least one LivePlayer, said LivePlayer being linked to said LiveServer remotely via a direct network link or a dialup to a terminal server of said LiveServer, each said LivePlayer having at least one Universal Resource Locator (URL) for identifying the location of an object on storage media or on a communication network and at least one local cache memory, a method for linking remote data sources for updating said data object seamlessly, said method comprising the steps of:
    (a) sending URL of said LivePlayer to said LiveServer;
    (b) checking at said LiveServer with a translation table of alternative addresses of said URL for changes to said URL;
    (c) returning a translated URL from said LiveServer to said LivePlayer if there is a change in step (b);
    (d) checking with said cache memory of said LivePlayer to determine if the resource associated with URL in step (c) has been previously fetched;
    (e) retrieving media from remote site over said network link if no resource exists on cache memory of said LivePlayer and storing the same on said cache memory;
    (f) contacting remote site over said network link if URL exists on cache memory of said LivePlayer and determining if said URL is updated; and
    (g) replacing the contents of cache memory with new file retrieved from remote site if URL in step (f) is outdated;
    whereby data objects in said applications are linked transparently with remote data sources and updated automatically.

2. The method for linking remote data sources with data object seamlessly in claim 1 wherein said LiveServer has a graphic user interface for controlling said LiveServer via a LiveCD service protocol.

3. The method for linking remote data sources with data object seamlessly in claim 2 wherein said LiveCD service protocol comprises a set of predetermined set of commands and responses.

4. The method for linking remote data sources with data object seamlessly in claim 3 wherein said commands and responses are sent in less than a predetermined packet length.

5. The method for linking remote data sources with data object seamlessly in claim 1 wherein said LiveServer maintains a set of remote data sources for said LivePlayer.

6. The method for linking remote data sources with data object seamlessly in claim 1 wherein said LiveServer maintains connections with multiple LivePlayers concurrently.

7. The method for linking remote data sources with data object seamlessly in claim 1 wherein said LiveServer receives from Resource Updater updated URLs.

8. The method for linking remote data sources with data object seamlessly in claim 1 wherein said LiveServer is coupled to a Proxy Network Server for providing at least one gateway to remote data sources to LivePlayers who are connected to said LiveServer via dialup.

9. The method for linking remote data sources with data object seamlessly in claim 1 wherein said LivePlayer comprises a plurality of dynamic linked libraries (DLLs) which allows users to create said applications for updating data objects.

10. The method for linking remote data sources with data object seamlessly in claim 9 wherein said LivePlayer DLL communicates with said applications through a predetermined application program interface (API).

11. In a system for creating applications for data object on storage media including at least one LiveServer adopted for accepting connections from at least one LivePlayer, said LivePlayer being linked to said LiveServer remotely via a direct network link or a dialup to a terminal server of said LiveServer, each said LivePlayer having at least one Universal Resource Locator (URL) for identifying the location of an object on storage media or on a communication network and at least one local cache memory, a method for linking remote data sources for updating said data object seamlessly, said method comprising the steps of:
    (a) sending URL of said LivePlayer to said LiveServer;
    (b) checking at said LiveServer with a translation table of alternative addresses of said URL for changes to said URL;
    (c) returning a translated URL from said LiveServer to said LivePlayer if there is a change in step (b);
    (d) checking with said cache memory of said LivePlayer to determine if the resource associated with URL in step (c) has been previously fetched;
    (e) retrieving media from remote site over said network link if no resource exists on cache memory of said LivePlayer and storing the same on said cache memory;
    (f) contacting remote site over said network link if URL exists on cache memory of said LivePlayer and determining if said URL is updated; and
    (g) replacing the contents of cache memory with new file retrieved from remote site if URL in step (f) is outdated; and
    (h) rendering with LivePlayer the contents of cache memory if URL in step (f) is updated,
    whereby data objects in said applications are linked transparently with remote data sources and updated automatically.

12. The method for linking remote data sources with data object seamlessly in claim 11 wherein said LiveServer has a graphic user interface for controlling said LiveServer via a LiveCD service protocol.

13. The method for linking remote data sources with data object seamlessly in claim 12 wherein said LiveCD service protocol comprises a set of predetermined set of commands and responses.

14. The method for linking remote data sources with data object seamlessly in claim 13 wherein said commands and responses are sent in less than a predetermined packet length.

15. The method for linking remote data sources with data object seamlessly in claim 11 wherein said LiveServer maintains a set of remote data sources for said LivePlayer.

16. The method for linking remote data sources with data object seamlessly in claim 11 wherein said LiveServer maintains connections with multiple LivePlayers concurrently.

17. The method for linking remote data sources with data object seamlessly in claim 11 wherein said LiveServer receives from Resource Updater updated URLs.

18. The method for linking remote data sources with data object seamlessly in claim 11 wherein said LiveServer is coupled to a Proxy Network Server for providing at least one gateway to remote data sources to LivePlayers who are connected to said LiveServer via dialup.

19. The method for linking remote data sources with data object seamlessly in claim 11 wherein said LivePlayer comprises a plurality of dynamic linked libraries (DLLS) which allows users to create said applications for rendering data objects.

20. The method for linking remote data sources with data object seamlessly in claim 19 wherein said LivePlayer DLL communicates with said applications through a predetermined application program interface (API).

21. The method for linking remote data sources with data object seamlessly in claim 19 wherein said API comprises media APIs, said media APIs renders and controls data object in said applications.

22. The method for linking remote data sources with data object seamlessly in claim 11 wherein said data object comprises static object.

23. The method for linking remote data sources with data object seamlessly in claim 11 wherein said data object comprises dynamic object, said dynamic object further comprising object updatable from remote data sources.

24. The method for linking remote data sources with data object seamlessly in claim 11 wherein said data object comprises a combination of static and dynamic objects.

25. In a system for creating applications for data object on storage media including at least one LiveServer adopted for accepting connections from at least one LivePlayer and at least one resource updater, said LivePlayer being linked to said LiveServer remotely via a direct network link or a dialup to a terminal server of said LiveServer, each said LivePlayer having at least one Universal Resource Locator (URL) for identifying the location of an object on storage media or on a communication network and at least one local cache memory, said resource updater being further linked to a resource provider for receiving updated data therefrom, a method for linking remote data sources for updating said data object seamlessly, said method comprising the steps of:

(a) announcing from said resource updater to said LiveServer that said remote data source has been updated;

(b) broadcasting from LiveServer to each LivePlayer connected thereto message that said remote data source has been updated;

(c) requesting LivePlayer to check the date of last modification of said remote data source;

(d) looking up URL from said local cache to determine if said data object is not outdated;

(e) retrieving URL with LivePlayer from remote site over said network link if said data object is outdated; and (f) replacing the contents of cache memory with new file retrieved from remote site;

whereby data objects in said applications are linked transparently with remote data sources and updated automatically.

26. The method for linking remote data sources with data object seamlessly in claim 25 wherein said resource updater is linked to said resource provider for updating all data object for which said resource provider is responsible.

* * * * *